US010925032B2

(12) United States Patent
Wu et al.

(10) Patent No.: US 10,925,032 B2
(45) Date of Patent: Feb. 16, 2021

(54) POLAR BIT ALLOCATION FOR PARTIAL CONTENT EXTRACTION

(71) Applicant: MEDIATEK INC., Hsinchu (TW)

(72) Inventors: Wei-De Wu, Hsin-Chu (TW); Chia-Wei Tai, Hsin-Chu (TW); Yen-Cheng Liu, Hsin-Chu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/149,914

(22) Filed: Oct. 2, 2018

(65) Prior Publication Data

US 2019/0104502 A1 Apr. 4, 2019

Related U.S. Application Data

(60) Provisional application No. 62/566,977, filed on Oct. 2, 2017, provisional application No. 62/583,564, filed
(Continued)

(51) Int. Cl.
*H04W 72/00* (2009.01)
*H04L 1/00* (2006.01)
(Continued)

(52) U.S. Cl.
CPC .......... *H04W 72/005* (2013.01); *H04H 60/00* (2013.01); *H04L 1/007* (2013.01);
(Continued)

(58) Field of Classification Search
CPC .. H04W 72/005; H04W 48/10; H04L 1/0041; H04L 27/26; H04L 25/00; H04L 1/007; H04L 1/0057; H04L 1/0058; H04H 60/00
See application file for complete search history.

(56) References Cited

U.S. PATENT DOCUMENTS 4,393,492 A * 7/1983 Bishop .............. H04J 3/14
370/225
6,341,730 B1 * 1/2002 Petrie ............... G06K 19/06046
235/454
(Continued)

FOREIGN PATENT DOCUMENTS

CN 101171765 A 4/2008
CN 103220001 A 7/2013
CN 106899379 A 6/2017

OTHER PUBLICATIONS

Vinck et al., Message dependent synchronization, IEEE, Conference Paper, pp. 1183-1187 (Year: 1988).*
(Continued)

*Primary Examiner* — April Y Blair
*Assistant Examiner* — Dipakkumar B Gandhi
(74) *Attorney, Agent, or Firm* — Oblon, McClelland, Maier & Neustadt, L.L.P.

(57) ABSTRACT

Aspects of the disclosure provide a method and device performing input bit allocation that includes receiving broadcasting information bits, generating timing related bits for the broadcasting information bits, and selecting a portion of the generated timing related bits. The method and device can further include allocating each of the selected timing related bits to selected input bits of an encoder, so that each of the selected timing related bits is allocated to an input bit of the encoder corresponding to an available bit channel of the encoder where the selected inputs bits of the encoder correspond to encoded bits that are located in a front portion of the encoded bits.

20 Claims, 11 Drawing Sheets

Related U.S. Application Data on Nov. 9, 2017, provisional application No. 62/592,209, filed on Nov. 29, 2017, provisional application No. 62/592,389, filed on Nov. 29, 2017.

(51) Int. Cl.
  *H04L 27/26* (2006.01)
  *H04H 60/00* (2009.01)
  *H04W 48/10* (2009.01)
  *H04L 25/00* (2006.01)
  *H04W 52/00* (2009.01)

(52) U.S. Cl.
  CPC .......... *H04L 1/0041* (2013.01); *H04L 1/0057* (2013.01); *H04L 1/0058* (2013.01); *H04L 25/00* (2013.01); *H04L 27/26* (2013.01); *H04W 48/10* (2013.01)

(56) References Cited

U.S. PATENT DOCUMENTS

| | | | | |
|---|---|---|---|---|
| 6,829,717 | B1* | 12/2004 | Roust | G06F 1/12 370/506 |
| 7,443,922 | B1* | 10/2008 | Venkata | H04J 3/0605 375/295 |
| 7,990,840 | B2 | 8/2011 | Laroia et al. | |
| 2006/0106600 | A1* | 5/2006 | Bessette | G10L 19/12 704/223 |
| 2006/0256822 | A1* | 11/2006 | Kwong | H04L 47/10 370/503 |
| 2008/0104102 | A1* | 5/2008 | Zhang | G06F 16/2272 |
| 2009/0015304 | A1* | 1/2009 | Yin | H04L 7/02 327/162 |
| 2010/0079316 | A1* | 4/2010 | Okuno | H03M 9/00 341/100 |
| 2011/0145681 | A1* | 6/2011 | Yang | H04L 1/005 714/773 |
| 2011/0235484 | A1* | 9/2011 | Horigome | G11B 7/0065 369/44.33 |
| 2014/0365842 | A1 | 12/2014 | Li et al. | |
| 2016/0182187 | A1* | 6/2016 | Kim | H03M 13/09 714/807 |
| 2016/0302024 | A1* | 10/2016 | Bennett | H04W 4/70 |
| 2016/0352464 | A1* | 12/2016 | Shen | H03M 13/13 |
| 2017/0180095 | A1* | 6/2017 | Xue | H04L 27/2601 |
| 2017/0187488 | A1* | 6/2017 | Rico Alvarino | H04L 1/0041 |
| 2017/0214416 | A1* | 7/2017 | Ge | H03M 13/13 |
| 2018/0294920 | A1 | 10/2018 | Chen et al. | |

OTHER PUBLICATIONS

International Search Report and Written Opinion dated Jan. 8, 2019 in PCT/CN2018/109335, 9 pages.

Combined Taiwanese Office Action and Search Report dated Dec. 9, 2019 in corresponding Taiwanese Patent Application No. 107134849 (with English Translation of Category of Cited Documents), 12 pages.

Huawei, HiSilicon, "Polar Code for PBCH and Soft Combining", 3GPP TSG RAN WG1 Meeting #90, R1-1712173, Aug. 21-25, 2017; 14 pages.

Sequans Communications, "Scrambling Pattern for Partial Timing Indication Over PBCH", 3GPP TSG RAN WG1 Meeting #90, R1-1712614, Aug. 21-25, 2017, 7 pages.

* cited by examiner

FIG. 8 (A)

Table. 2 Mapping function of polar bit allocator

| Input bit position | | | | | | | | | | | | | | | | | |
|---|---|---|---|---|---|---|---|---|---|---|---|---|---|---|---|---|---|
| 238 | 239 | 240 | 241 | 242 | 243 | 244 | 245 | 246 | 247 | 248 | 249 | 250 | 251 | 252 | 253 | 254 | 255 |
| Frz bit | Frz bit | Frz bit | Frz bit | Frz bit | Frz bit | Frz bit | 0 | Frz bit | Frz bit | Frz bit | Frz bit | 2 | 3 | 5 | | | |

| 366 | 367 | 368 | 369 | 370 | 371 | 372 | 373 | 374 | 375 | 376 | 377 | 378 | 379 | 380 | 381 | 382 | 383 |
|---|---|---|---|---|---|---|---|---|---|---|---|---|---|---|---|---|---|
| Frz bit | 7 | Frz bit | Frz bit | Frz bit | Frz bit | 10 | Frz bit | Frz bit | Frz bit | Frz bit | Frz bit | Frz bit | 11 | Frz bit | 12 | 14 | 15 |

| 430 | 431 | 432 | 433 | 434 | 435 | 436 | 437 | 438 | 439 | 440 | 441 | 442 | 443 | 444 | 445 | 446 | 447 |
|---|---|---|---|---|---|---|---|---|---|---|---|---|---|---|---|---|---|
| Frz bit | 19 | Frz bit | Frz bit | Frz bit | Frz bit | Frz bit | Frz bit | Frz bit | 21 | Frz bit | 24 | Frz bit | Frz bit | 26 | 30 | 31 | 32 (CRC 0) | 1 |

(Note: 446 contains "32 (CRC 0)", 447 contains "1")

| 398 | 399 | 400 | 401 | 402 | 403 | 404 | 405 | 406 | 407 | 408 | 409 | 410 | 411 | 412 | 413 | 414 | 415 |
|---|---|---|---|---|---|---|---|---|---|---|---|---|---|---|---|---|---|
| Frz bit | Frz bit | Frz bit | Frz bit | Frz bit | Frz bit | Frz bit | Frz bit | Frz bit | Frz bit | Frz bit | Frz bit | Frz bit | Frz bit | Frz bit | Frz bit | Frz bit | 18 |

| 462 | 463 | 464 | 465 | 466 | 467 | 468 | 469 | 470 | 471 | 472 | 473 | 474 | 475 | 476 | 477 | 478 | 479 |
|---|---|---|---|---|---|---|---|---|---|---|---|---|---|---|---|---|---|
| Frz bit | 4 | Frz bit | Frz bit | Frz bit | Frz bit | 6 | 8 | 13 | Frz bit | 16 | 20 | 22 | 25 | 27 | 33 (CRC 1) | 9 | |

| 480 | 481 | 482 | 483 | 484 | 485 | 486 | 487 | 488 | 489 | 490 | 491 | 492 | 493 | 494 | 495 | 496 | 497 |
|---|---|---|---|---|---|---|---|---|---|---|---|---|---|---|---|---|---|
| Frz bit | Frz bit | Frz bit | 17 | Frz bit | 23 | 28 | 34 (CRC 2) | Frz bit | 29 | 35 (CRC 3) | 36 (CRC 4) | 37 (CRC 5) | 38 (CRC 6) | 39 (CRC 7) | 40 (CRC 8) | Frz bit | 41 (CRC 9) |

FIG. 8 (B)

POLAR BIT ALLOCATION FOR PARTIAL CONTENT EXTRACTION

INCORPORATION BY REFERENCE

This present disclosure claims the benefit of U.S. Provisional Application No. 62/566,977, "NR PBCH Coding Design" filed on Oct. 2, 2017, U.S. Provisional Application No. 62/583,564, "NR PBCH Design for Partial Content Extraction" filed on Nov. 9, 2017, U.S. Provisional Application No. 62/592,209, "PBCH Bit Mapping Design" filed on Nov. 29, 2017, and U.S. Provisional Application No. 62/592,389, "PBCH Bit Mapping Design Before First PBCH Scrambling" filed on Nov. 29, 2017, all of which are incorporated herein by reference in their entirety.

TECHNICAL HELD

The present disclosure relates to wireless communications, and specifically relates to physical broadcast channel (PBCH) data processing in wireless communication networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Fifth generation (5G) wireless communication networks employ beamforming techniques to concentrate transmission towards a certain direction, and extend coverage. For example, beam sweeping may be performed to cover a serving area in a wireless communication system. System information and frame timing information carried on physical broadcast channel (PBCH) may be repeatedly broadcasted towards different directions during the beam sweeping. In 5G new radio (NR) measurement, a user equipment (UE) may need to decode PBCH in order to extract the frame timing information. However, the decoding complexity overhead for the UE may be too high when there are multiple cells to be measured at the same time.

SUMMARY

Aspects of the disclosure provide a method for input bit allocation of an encoder. The method includes receiving broadcasting information bits and generating timing related bits for the broadcasting information bits. The method can further include selecting a portion of the generated timing related bits and allocating each of the selected timing related bits to selected input bits of the encoder, so that each of the selected timing related bits is allocated to an input bit of the encoder corresponding to an available bit channel of the encoder where the selected input bits of the encoder correspond to encoded bits that are located in a front portion of the encoded bits.

In one embodiment, the input bits of the encoder are each associated with a bit channel having a reliability. The bit channel reliabilities range from a low reliability to a high reliability. Accordingly, the broadcasting information bits and the generated timing related bits are allocated in the input bits of the encoder corresponding to available bit channels with a highest reliability, and the selected portion of the generated timing related bits are allocated in a front portion of the input bits of the encoder that are allocated to the broadcasting information bits and the generated timing related bits.

In one embodiment, the broadcasting information bits include both system information and part of frame system number. The generated timing related bits for the broadcasting information bits can further include at least a half-radio frame indication bit, three SS block index MSBs.

In one embodiment, the method includes selecting the half-radio frame indication bit and the three SS block index MSBs.

In one embodiment, the broadcasting information bits and the generated timing related bits form a physical broadcast channel (PBCH) payload.

Aspects of the disclosure provide another method for input bit allocation. The method includes selecting available input bits of an encoder having a highest reliability in a front half portion of the encoder, receiving broadcasting information bits, and generating timing related bits for the broadcasting information bits. The method can further include selecting a portion of the generated timing related bits and allocating each of the selected timing related bits to the selected input bits of the encoder, so that each of the selected timing related bits is allocated to the selected front half portion of input bits of the encoder.

Aspects of the disclosure provide an input bit allocation device that is configured to include an encoder and a polar bit allocator. The encoder is configured to polar encode input bits of the encoder to encoded bits of the encoder. The polar bit allocator is configured to select a portion of timing related bits that are generated for broadcasting information bits and allocate each of the selected timing related bits to selected input bits of the encoder, so that each of the selected timing related bits is allocated to an input bit of the encoder corresponding to an available bit channel of the encoder where the selected inputs bits of the encoder correspond to encoded bits that are located in a front portion of the encoded bits.

BRIEF DESCRIPTION OF THE DRAWINGS

Various embodiments of this disclosure that are proposed as examples will be described in detail with reference to the following figures, wherein like numerals reference like elements, and wherein:

FIG. 8A shows a PBCH interleaver pattern according to an embodiment of the disclosure;

FIG. 8B shows an exemplary table that maps a PBCH payload to input bits of an encoder according to an embodiment of the disclosure;

DETAILED DESCRIPTION OF EMBODIMENTS

Figure 1:
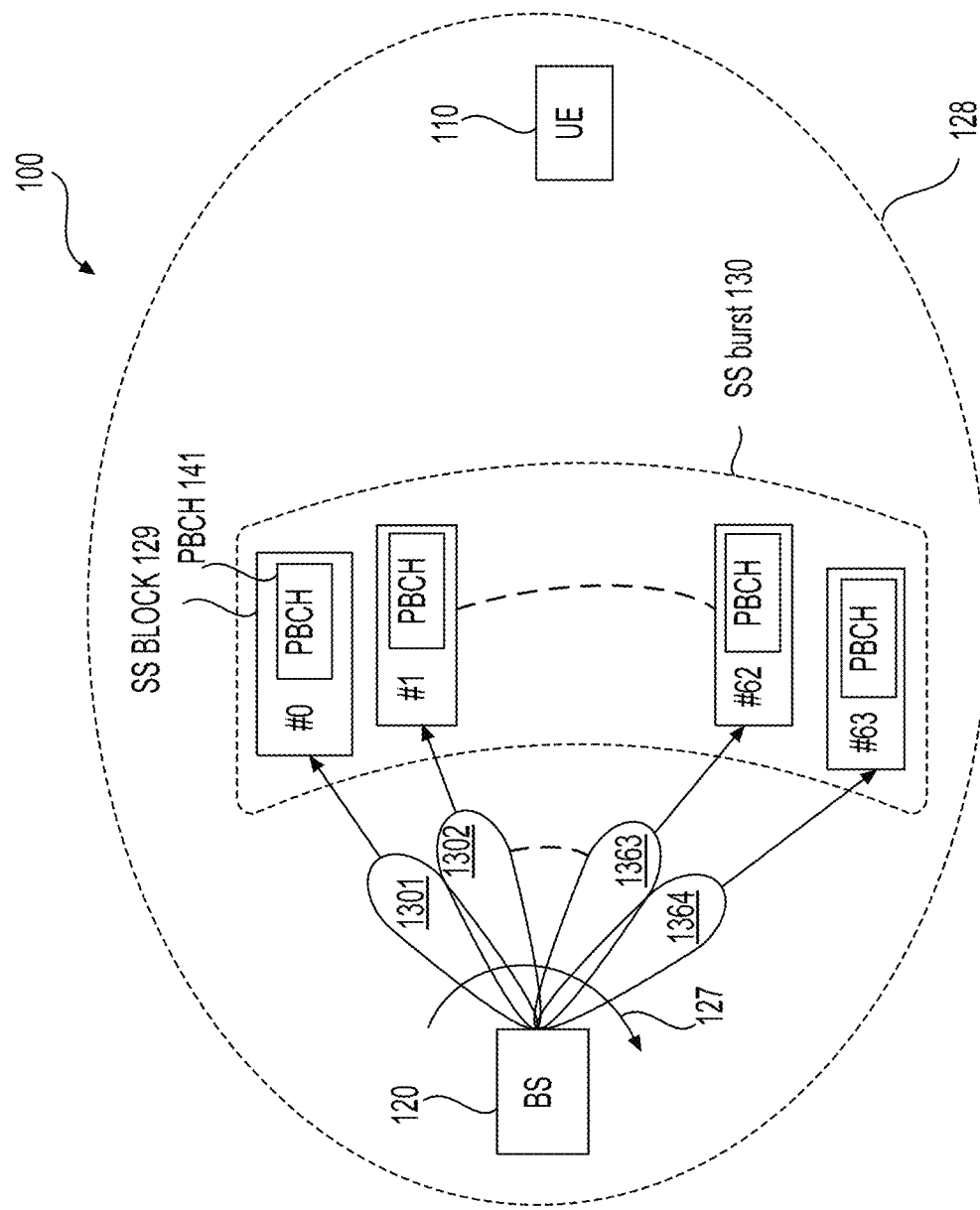
FIG. 1 shows an exemplary wireless communication system according to an embodiment of the disclosure.

FIG. 1 shows an exemplary wireless communication system 100 according to an embodiment of the disclosure. The system 100 includes user equipment (UE) 110 and a base station (BS) 120. The system 100 employs 5th generation (5G) wireless communication technologies developed by the 3rd Generation Partnership Project (3GPP), or other wireless technologies developed by other organizations. The system 100 may include other BSs and UEs that are not shown in FIG. 1.

In some examples, 5G new radio (NR) millimeter Wave (mm-Wave) frequency bands and beamforming technologies are employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omni-directional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate for path loss or penetration loss in mm-Wave signal transmission.

The BS 120 can be a base station implementing a gNB node as specified in 5G new radio (NR) air interface standards developed by 3GPP. The BS 120 can be configured to control one or more antenna arrays to form directional Tx or Rx beams for transmitting or receiving wireless signals.

In the FIG. 1 embodiment, the BS 120 can control an antenna array to form Tx beams 1301-1364 to cover a cell 128. The beams 1301-1364 can be generated towards different directions. The beams 1301-1364 can be generated simultaneously or in different time intervals in different examples. In one example, the BS 120 is configured to perform a beam sweeping 127 to transmit downlink control channel and/or data channel signals. During the beam sweeping 127, the beams 1301-1364 can be successively formed in a time division multiplex (TDM) manner to cover the cell 128. During each time interval for transmission of one of the beams 1301-1364, a set of L1/L2 control channel data and/or data channel data can be transmitted with the respective Tx beam. The beam sweeping 127 can be performed repeatedly with a certain period.

In alternative examples, the beams 1301-1364 may be generated in a way other than performing a beam sweeping. For example, multiple beams towards different directions may be generated at a same time. In other examples, one beam may be repeatedly generated towards one direction. The respective beam may have a beam width different from the beams 1301-1364. Corresponding to different configurations and BS capabilities, the maximum number of beams generated from a BS can be different, such as 4, 8, 64, and the like.

In one example, the beams 1301-1364 of the cell 128 can be associated with synchronization signal blocks 129 (SS blocks) (also known as SS/physical broadcast channel (PBCH) blocks). Each SS block 129 corresponds to a set of resource elements carried on several consecutive orthogonal frequency division multiplexing (OFDM) symbols in an OFDM based system. Each SS block 129 can include a PBCH. The PBCH carries informational bits of system information and frame timing information. In some examples, the group of informational bits is referred to as master information block (MIB). Each SS block 129 may be associated with an SS block index (SBI). The SBI indicates a timing of the respective SS block, thus is also known as an SS block timing index. As shown in FIG. 1, the SS blocks 129 are associated with indexes from #0 to #63.

For example, the BS 120 may periodically transmit a sequence of SS blocks 129 (referred to as an SS burst 130). The SS burst 130 may be transmitted by performing a beam sweeping 127 as shown in the FIG. 1 embodiment. Each SS block 129 of the SS burst 130 is transmitted using one of the beams 1301-1364. The respective SBI indicates a timing or location of each SS block within the SS burst 130. In addition, the MIB of the PBCH transmitted within an SS burst 130 can be maintained unchanged, for example, for at least a certain number of consecutive SS blocks. In alternative embodiments, the BS 120 may not employ multiple beams. For example, the BS 120 may transmit to cover the cell 128 without beamformed transmission. Under such configuration, the SS blocks 129 are successively transmitted in time domain, however, each transmission is performed towards every direction within the cell 128.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals.

Figure 2:
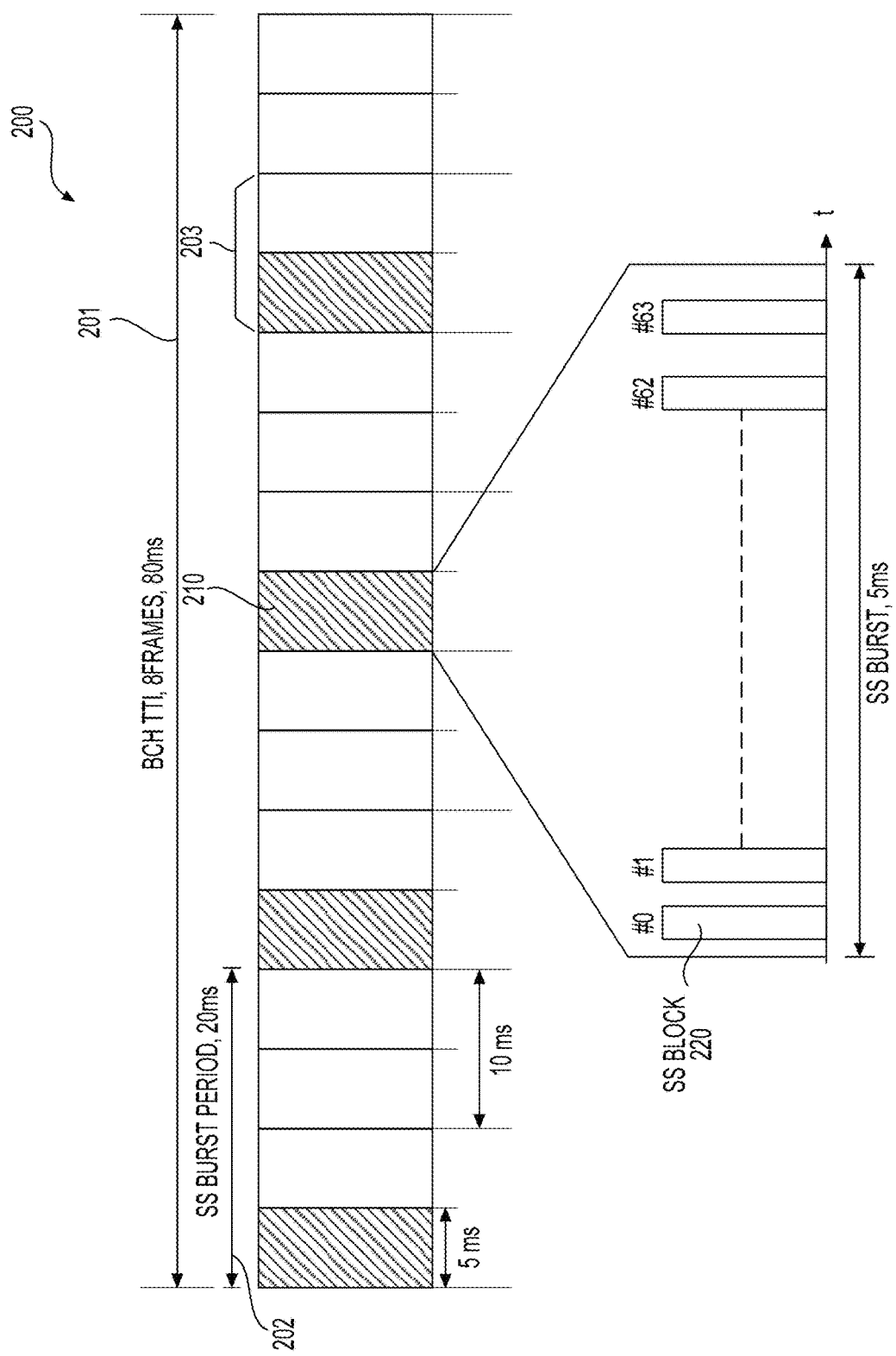
FIG. 2 shows an example of synchronization signal block (SS block) transmission configuration according to an embodiment of the disclosure.

FIG. 2 shows an example of SS block transmission configuration 200 according to an embodiment of the disclosure. A sequence of 8 frames 203 is shown in a broadcast channel (BCH) transmission time interval (TTI) 201. The BCH TTI can have duration of 80 ms. A sequence of SS bursts 210 can be transmitted among the frames 203 with a period 202 of 20 ms. In various examples, the SS burst transmission period can be 5, 10, 20, 40, 80, 160 ms, and the like. Each SS burst 210 is contained in a half-frame time window (5 ms). Depending on the configuration, the half-frame time window may be a first or a second half frame.

Each SS burst 210 may include a sequence of SS blocks 220 each associated with an SBI. Depending on subcarrier spacing (numerology) configurations, numbers and locations (timings) of SS blocks within an SS burst 210 can be different. For example, a maximum number L of candidate SS block locations can be 4, 8, or 64 in different configurations. Accordingly, SBIs can be represented with 2, 3 or 6 bits. FIG. 2 shows an example of the SS burst configuration corresponding to 64 SS blocks. The 64 SS blocks are transmitted on the 64 candidate locations, and have SBIs of #0-#63. In addition, whether an SS burst is in a first or a second half frame is indicated by a half-radio frame (HRF) indication bit (C0) which is in each SS block 220 of the SS burst 210. Thus, the HRF bit and the SBI bits of an SS block can represent the timing information of the SS block.

Figure 3:
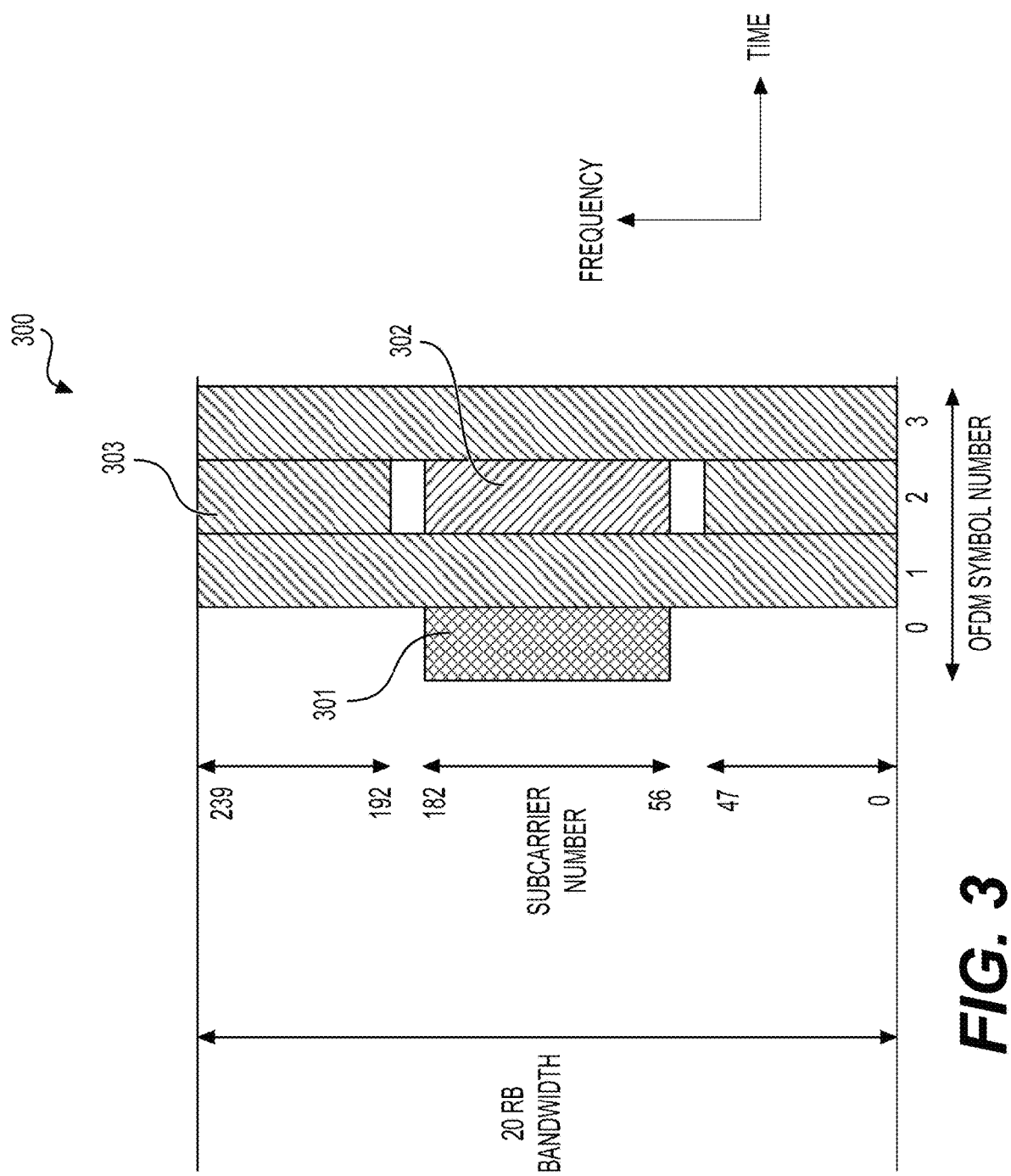
FIG. 3 shows an example SS block according to an example of the disclosure.

FIG. 3 shows an example SS block 300 according to an embodiment of the disclosure. The SS block 300 can include a primary synchronization signal (PSS) 301, a secondary synchronization signal (SSS) 302, and a PBCH 303 (represented with shaded areas designated with numbers of 301, 302, and 303, respectively). Those signals can be carried in resource elements (REs) on a time-frequency resource grid as shown in FIG. 3. In addition, the SS block 300 can carry demodulation reference signals (DMRSs) (not shown) in a subset of REs in the shaded area 303. The REs carrying DMRSs are not used for carrying PBCH signals in one example.

In one embodiment, the SS block 300 can be distributed over 4 OFDM symbols in time domain and occupy a 20 resource block (RB) bandwidth in frequency domain. As shown in FIG. 3, the 4 OFDM symbols are numbered from 0 to 3, while the 20-RB bandwidth includes 240 subcarriers numbered from 0 to 239. Specifically, the PSS 301 can occupy REs at symbol 0 and subcarriers 56-182. The SSS 302 can occupy REs at symbol 2 and subcarriers 56-182. The PBCH 303 can be located at symbols 1-3 and occupy 20 RBs at symbols 1 and 3, and 8 RBs (96 subcarriers) at symbol 2.

In one embodiment, the SS block 300 is configured to carry bits of an SBI by using the DMRSs (not shown in FIG. 3) and the PBCH 303. For example, for an SBI with a maximum of 6 bits, 3 least significant bits (LSBs) of the SBI are carried by the DMRSs and 3 most significant bits (MSBs) of the SBI are carried by the PBCH 303. In one embodiment, by decoding the PSS 301 and the SSS 302, a physical layer cell identification (ID) can be determined. The cell ID indicates which cell the SS block 300 is associated with.

Figure 4:
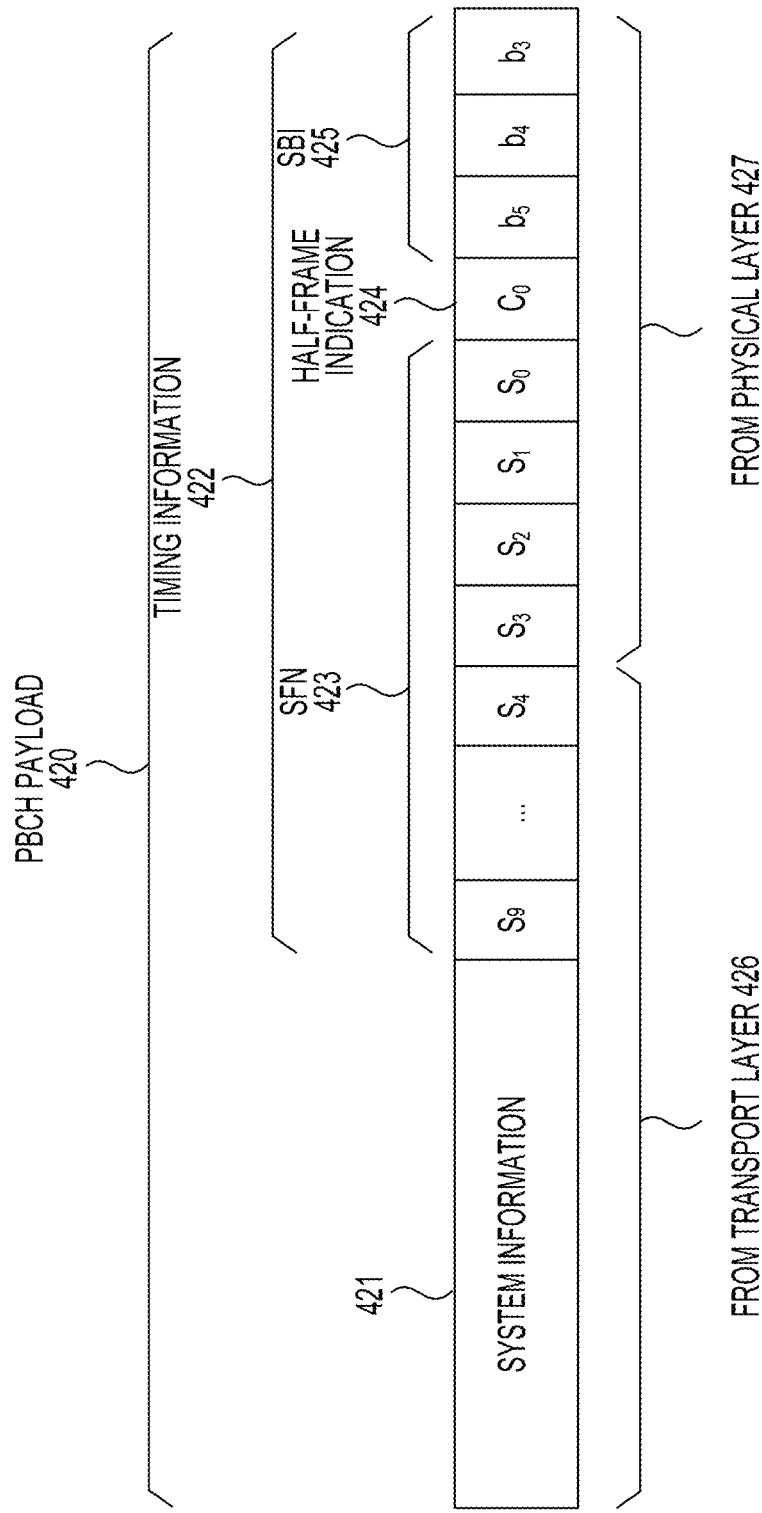
FIG. 4 shows an example of PBCH payload according to an exemplary embodiment of the disclosure.

FIG. 4 shows an example of PBCH payload 420 according to an exemplary embodiment of the disclosure. The PBCH payload 420 can include system information 421 and timing information 422. The timing information 422 can include a 10-bit system frame number (SFN) 423, a half-radio frame (HRF) indication bit (C0) 424, and 3 SBI's MSBs b4, b3) 425. In addition, a first part 426 of the PBCH payload 420 can be received from a transport layer, and a second part 427 of the PBCH payload 420 can be generated at a physical layer. The first part 426 may include system information 421 and 6 SFN's MSBs (S4-S9), while the second part 427 may include 4 SFN's LSBs (S0-S3), the HRF bit (C0), and 3 SBI's MSBs (b3-b5). In addition, the transport layer and the physical layer can be the layers of a protocol stack of the system 100 that is specified in 3GPP 5G standards.

For each transmission of an SS block, a PBCH payload can be formulated at the physical layer. The bits of first part 426 received from transport layer do not change within a BCH TIT. The SFN bits S0-S3 and the HRF bit (C0) do not change for each SS burst which is contained within a half frame.

An SBI indicates timing information of the respective SS block. MSBs of the SBI (b5, b4, b3) are located in PBCH and LSBs of the SBI are located in DMIRS (not shown in FIG. 4). In one example, an SBI's LSBs detection may be performed with a sequence matching that may need 8 matching permutations for 3 LSBs, thus a decoding procedure is not necessary for the LSBs detection. In contrast to the LSBs detection, the SBI's MSBs detection may be performed with full PBCH decoding methods that can be around the similar level as PDCCH monitoring in terms of decoding complexity and power consumption. However, in a 5G NR measurement, it may not be necessary for an NR UE to decode a full PBCH. In other words, a 5G NR measurement may only need part of the timing related information, such as an SBI's MSBs (b5, b4, b3) and HRF bit (C0), instead of the full PBCH. Thus, decoding complexity of an NR PBCH design may be minimized by efficiently acquiring the timing related bits corresponding to the SBI's MSBs (b5, b4, b3) and HRF bit (C0).

In one embodiment, part of the timing related bits (i.e., b5, b4, b3, C0) of a PBCH payload may be allocated in front positions of an encoder input, based on an assumption that these bits will be decoded early by a UE. That is to say, these four bits (b5, b4, b3, C0) may be decoded earlier than other bits in a decoder of the UE. Once the UE acquires these four bits (b5, b4, b3, C0), the decoding process can be terminated without further decoding other bits, and thus power saving can be achieved. Such a procedure can be referred to as an early termination procedure.

Figure 5:
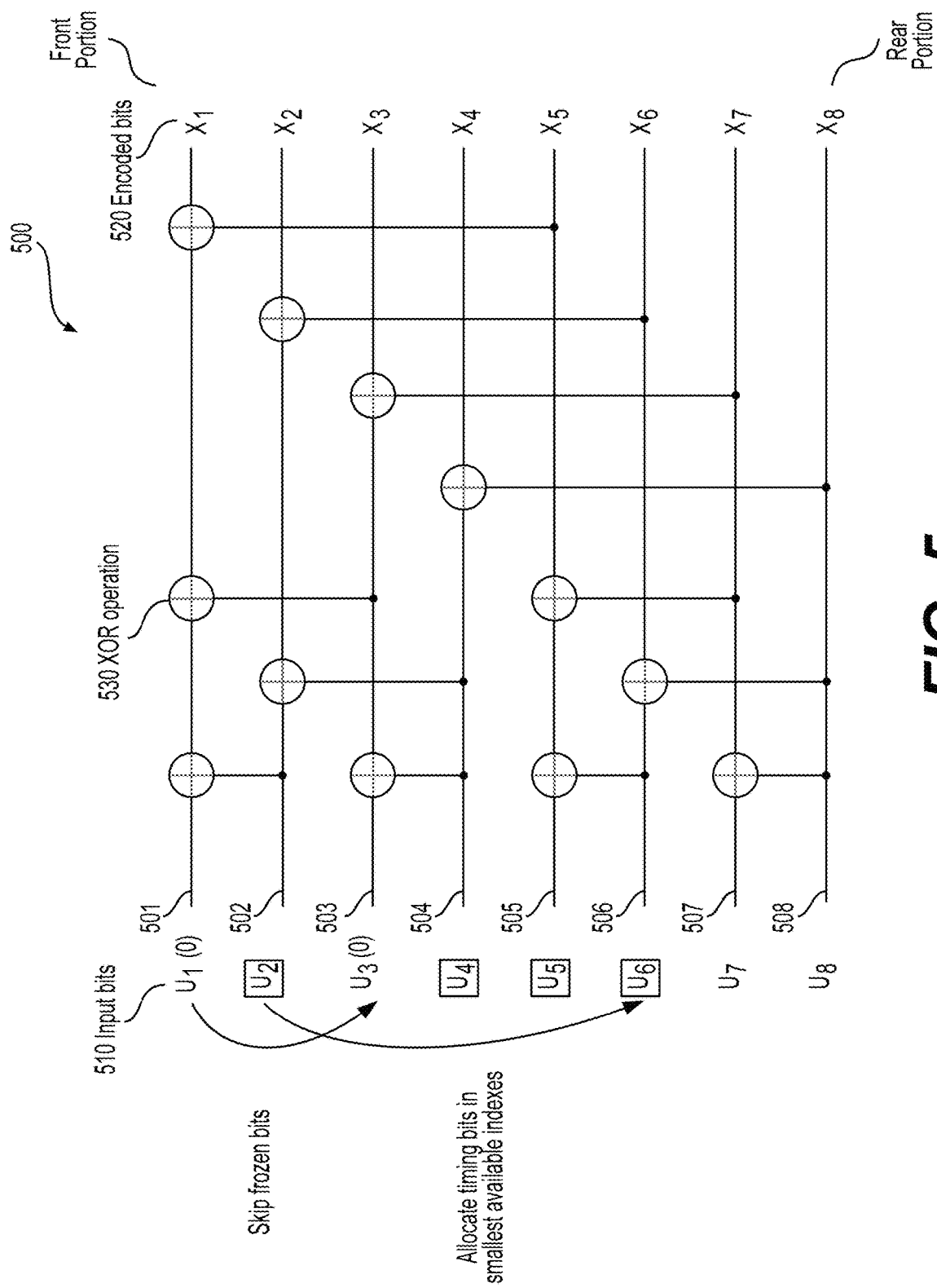
FIG. 5 shows a polar graph illustrating an exemplary polar bit allocation according to an embodiment of the disclosure.

FIG. 5 shows a polar graph 500 illustrating an exemplary polar bit allocation according to an embodiment of the disclosure. As shown, a sequence 510 of input bits U1-U8 is arranged at the left side of the polar graph 500, while a sequence 520 of encoded bits X1-X8 is arranged at the right side of the polar graph 500. The polar graph 500 includes eight bit channels 501-508, each between a pair of input and encoded bits. Each pair of input and encoded bits and the respective bit channels share a same index from 1 to 8. Further, as shown, the bit channels 501-508 can be selectively coupled with one another by XOR operations 530.

In one embodiment, the bit channels 501-508 are arranged in order of increasing reliability in the polar graph 500, with bit channels in a front portion having a lower reliability than those in a rear portion. For example, the reliability of the bit channel 502 may be higher than that of the bit channel 501, and the reliability of the bit channel 503 may be higher than that of the bit channel 502, etc. However, it is noted that the increasing order of reliability is not strict, and may not always be a in a consistent increasing order. In one example, the reliability of the bit channel 502 may be lower than that of the bit channel 501, or the reliability of the bit channel 505 may be lower than that of the bit channel 504. However, generally the lower reliability bit channels 501-504) are arranged in a front portion of the polar graph 500, while the higher reliability bit channels (i.e., 505-508) are arranged in a rear portion of the polar graph 500, as shown in FIG. 5.

In one embodiment, part of the timing related bits (i.e., b5, b4, b3, C0) of a PBCH payload can be allocated to available bit channels in the front portion of the polar graph. By allocating these four timing related bits to bit channels in the front portion of the polar graph, decoding complexity and power consumption can be reduced. This is because the decoder will be able to decode these four timing related bits first. Once the decoder decodes these four timing related bits, i.e., SBI's MSBs (b5, b4, b3) and HRF bit (C0), the decoding procedure can be terminated, as appropriate, without having to decode the entire transmission. In other words, when the decoding is performed sequentially, the bits in front positions of a sequence of bits received by a UE may be decoded earlier than the bits in rear positions of the sequence of bits. Accordingly, when these four timing related bits (i.e., b5, b4, b3, C0) are allocated in front positions of a sequence of input bits of an encoder during encoding, a decoder may subsequently decode these four timing related bits earlier than other bits. As a result, the decoder can terminate the decoding procedure after obtaining these four timing related bits to reduce power consumption.

It may be noted that some of the front positions of an encoder input may not be available. In the FIG. 5 example, U1 and U3 are shown as frozen bits, and thus unavailable for allocating timing related bits. In such a case, the timing related bits can be allocated in positions with smallest available indexes (U2, U4, U5, and U6). Thus, the allocation procedure in this embodiment may include four steps: (1) identify and skip frozen bits and unavailable positions in a sequence of input bits of an encoder; (2) select a portion of timing related bits from a PBCH payload; (3) select some available positions with smallest available indexes in the sequence of input bits of the encoder for the selected timing related bits; and (4) allocate the selected timing related bits to the selected input bit positions of the encoder. Further, while shown in FIG. 5 as only including eight bit channels, it should be understood that any number of channels can be used, such as 512 bit channels with corresponding input and encoded bits.

In another embodiment including 512 bit channels in the polar graph, the input bits having a highest reliability in the sequence of input bits of an encoder may be selected for a PBCH payload including system information and timing information. The four timing related bits (i.e., b5, b4, b3, C0) of the PBCH payload can be allocated to a front portion of selected input bits. Thus, the allocation procedure in this embodiment may include four steps: (1) identify and skip frozen bits and unavailable positions in a sequence of input bits of an encoder; (2) select a portion of timing related bits from a PBCH payload; (3) select some available positions with a highest reliability in the sequence of input bits of the encoder for the PBCH payload; and (4) allocate the selected timing related bits to a front portion of the selected input bit positions of the encoder. In such a case, both reliability and early termination can be satisfied in the decoding procedure.

Figure 6:
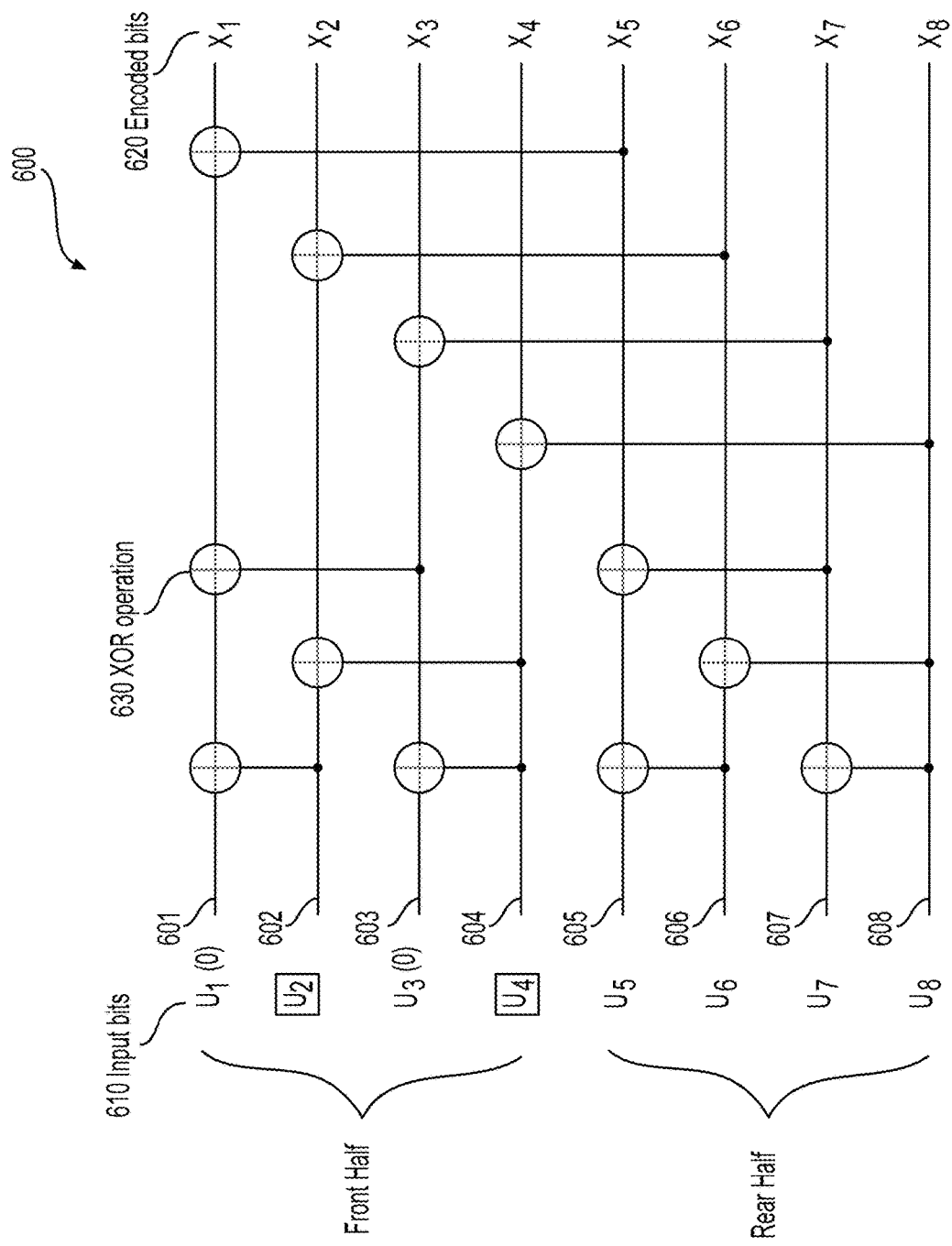
FIG. 6 shows a polar graph illustrating another exemplary polar bit allocation according to an embodiment of the disclosure.

FIG. 6 shows a polar graph illustrating an exemplary polar bit allocation according to another embodiment of the disclosure. Similar to FIG. 5, a sequence 610 of input bits U1-U8 is arranged at the left side of the polar graph 600, while a sequence 620 of encoded bits X1-X8 is arranged at the right side of the polar graph 600. The polar graph 600 includes eight bit channels 601-608 each between a pair of input and encoded bits. Each pair of input and encoded bits and the respective bit channel share a same index from 0 to 7. Further, as shown, the bit channels 601-608 can be selectively coupled with one another channel by XOR operations 630. While shown as only including eight bit channels, it should be understood that any number of channels can be used, such as 512 bit channels with corresponding input and encoded bits.

In one embodiment, the bit channels 601-608 are arranged in order of increasing reliability in the polar graph 600, with the lower reliability channels in a front half and the higher reliability channels in a rear half. For example, the reliability of the bit channel 602 may be higher than that of the bit channel 601, and the reliability of the bit channel 603 may be higher than that of the bit channel 602, etc. However, it is noted that the increasing order of reliability is not strict, and may not always be a in a consistent increasing order. In one example, the reliability of the bit channel 602 may be lower than that of the bit channel 601, or the reliability of the bit channel 605 may be lower than that of the bit channel 604. However, generally the lower reliability bit channels (i.e., 601-604) are arranged in the front half of the polar graph 600, while the higher reliability bit channels (i.e., 605-608) are arranged in the rear half of the polar graph 600, as shown in FIG. 6.

It may be noted that some of the sequence of input bits U1-U8 may not be available for allocating timing related bits. In the FIG. 6 example, U1 and U3 are shown as frozen bits, and thus unavailable for allocating timing related bits. In such a case, the timing related bits can be allocated in available positions, such as U2 and U4-U8.

In operation, the encoder predetermines some available input bit positions for the four timing related bits (i.e., b5, b4, b3, C0), and then allocates the four timing related bits (i.e., b5, b4, b3, C0) to the predetermined input bit positions. Accordingly, a decoder can decode the received four timing related bits with sequence matching procedure that is similar to the ones used to detect SBI's LSBs in DMRS. Because the predetermined positions for the four timing related bits are known by the decoder, the decoding algorithm can be simplified, and thus save power and time when decoding.

In one embodiment, the encoder can predetermine an available input bit based on reliability of the corresponding channel. For example, the encoder can select the available input bits having a highest reliability in a front portion, such as the front half portion, of an encoder. Since the bit channels 601-608 are generally arranged in order of increasing reliability in the polar graph 600, the bit channel 604 has the highest reliability in the front half portion 601-604. Accordingly, in the FIG. 6 example, the input bit U4 that is associated with the channel 604 can be predetermined as an input bit for one of the timing related bits. Once U4 is predetermined, the next available input bit having the highest reliability in the front half portion U1-U4 is U2, because U3 is a frozen bit. It is noted that the ordering of the channel reliability is known by the decoder. That is to say, both encoder and decoder can use the same reliability ordering. Further, while shown in FIG. 6 as only including eight bit channels, it should be understood that any number of channels can be used, such as 512 bit channels with corresponding input and encoded bits.

In another example including 512 bit channels in the polar graph, the four timing related bits (i.e., b5, b4, b3, C0) of a PBCH payload are allocated to predetermined input bit positions 255, 254, 253, and 247, which associate four most reliable bit (MSB) channels in a front half portion (256 bit channels) of the 512 bit channels in the polar graph. It is noted that the front half portion (256 bits) of the encoded bits (512 bits) of the encoder is outcome by XOR operation between the front half portion of the input bits and the rear half portion of the input bits. Accordingly, when a HE receives the encoded PBCH bits, the UE can do XOR operation again between the front half portion of the encoded bits and the rear half portion of the encoder bits. At a result, the front half portion of the encoded bits without XOR effect can be extracted by the UE. The extracted front half portion of the encoded bits may be equivalent to the front half portion of the input bits of the encoder. In addition, the predetermined positions for the four timing related bits in the front half portion of the input bits of the encoder are known by the UE. Thus, the UE can select the four timing related bits from the extracted front half portion of the encoded bits according to the predetermined positions and then can perform a simplified matching algorithm to detect the four timing related bits. For example, the UE decoder can perform a sequence matching algorithm that can compare the four timing related bits to sixteen matching permutations to determine a match. Accordingly, decoding complexity and power consumption can be reduced, or a decoder is even not necessary under this condition. Thus, the allocation procedure in this embodiment may include four steps: (1) identify and skip frozen bits and unavailable positions in a sequence of input bits of an encoder; (2) select a portion of timing related bits from a PBCH payload; (3) select some available input bits having a highest reliability in a front half portion of input bits of the encoder as predetermined positions for the selected portion of the timing related bits; and (4) allocate each of the selected timing related bits to the predetermined input bit positions of the encoder.

Figure 7:
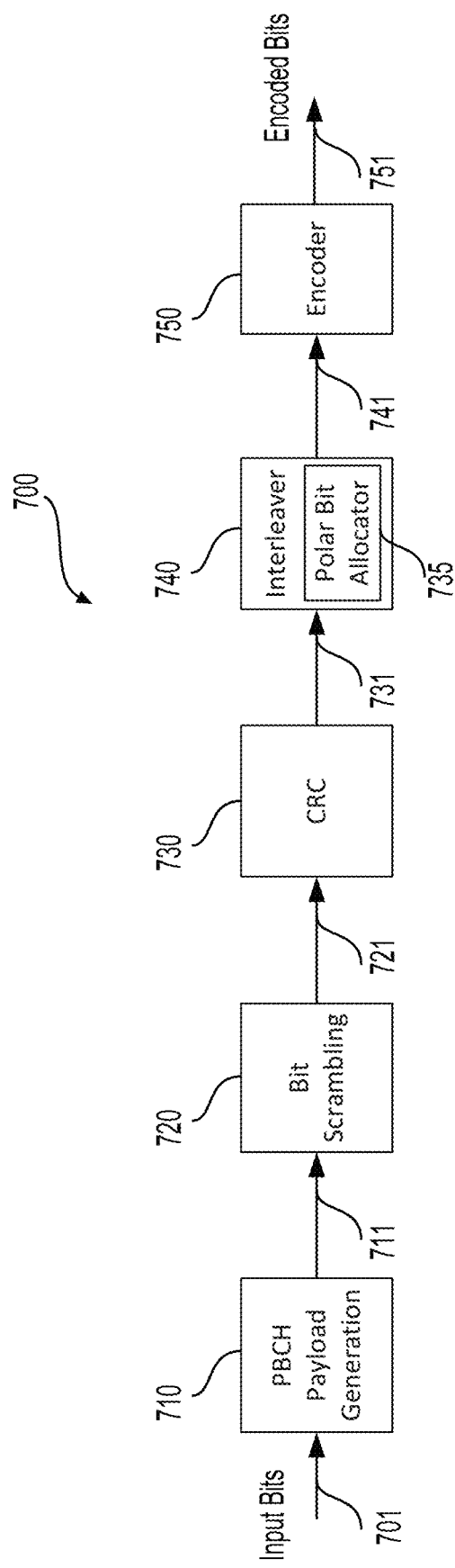
FIG. 7 shows an exemplary system for allocating selected timing related bits according to an embodiment of the disclosure.

FIG. 7 shows an exemplary system 700 for allocating selected timing related bits according to an embodiment of the disclosure. As shown, the system 700 includes a PBCH payload generation block 710, a bit scrambling block 720, a CRC block 730, an interleaver block 740, and an encoder 750. As shown, the interleaver block 740 further includes a polar bit allocator 735.

In operation, the PBCH payload generation block 710 can receive a sequence of input bits 701 from an upper layer (e.g., a transport layer). Based on these input bits 701, the PBCH payload generation block 710 generates a PBCH payload 711. Specifically, the sequence of input bits 701 may be denoted by $\bar{a}_0, \bar{a}_1, \bar{a}_2, \ldots, \bar{a}_{\bar{A}-1}$, where $\bar{A}$ is the number of system information bits, for example A can be 24 for 24 system information bits. Through the PBCH payload generation block 710, additional timing related bits $\bar{a}_{\bar{A}}, \bar{a}_{\bar{A}+1}, \bar{a}_{\bar{A}+2}, \ldots, \bar{a}_{\bar{A}+7}$ can be generated. These timing related bits can be included with the sequence of input bits to form the PBCH payload 711. Accordingly, the PBCH payload 711 would include $a_0, a_1, \ldots, a_{A-1}$ where $A=\bar{A}+8$ is the length of the PBCH payload 711. In PBCH payload 711, bits located at $a_{10}, a_{11}, a_{12}, a_{13}$ are selected timing related bits that are needed by a decoder for performing early termination.

Subsequently, the PBCH payload 711 is received by the bit scrambling block 720 which generates a scrambled PBCH payload 721 based on the PBCH payload 711. The CRC block 730 then receives the scrambled PBCH payload 721 and encodes it with a CRC code. The output data 731 of the CRC block 730 is subsequently transmitted to the interleaver block 740.

The interleaver block 740 can transform the output data 731 of the CRC block 730 into an interleaved PBCH payload 741, including a distributed CRC code and PBCH payload. The polar bit allocator 735 within the interleaver block 740, can also map each bit of the interleaved PBCH payload 741 to a corresponding input bit position of the encoder 750. The encoder 750 encodes the interleaved PBCH payload 741 and generates a sequence of encoded bits 751.

In one embodiment, the polar bit allocator 735 may first identify and skip frozen bits and unavailable input bit positions of the encoder 750, and then allocate the selected timing related bits in the interleaved PBCH payload 741 to the input bit positions with smallest available indexes, such as those in a front portion. In such a case, when a UE receives such an encoded PBCH payload, the UE can decode the encoded PBCH payload. Because the selected timing related bits in the encoded PBCH payload are located in the smallest available indexes, the decoder can extract and decode the selected timing related bits earlier than other bits. As a result, the decoding procedure can be terminated earlier when the selected timing related bits are only necessary to be known. Accordingly, the decoding complexity and power consumption can be reduced for the UE.

In another embodiment, after identifying and skipping frozen bits and unavailable positions of the encoder 750, the polar bit allocator 735 may select some input bit positions having a highest reliability in the sequence of input bits of the encoder 750 for allocating an interleaved PBCH payload 741. Then the polar bit allocator 735 may allocate the selected timing related bits in the interleaved PBCH payload 741 to the front portion of the selected input bit positions. In such as case, both transmission reliability and early termination can be satisfied.

In another embodiment, after identifying and skipping frozen bits and unavailable positions of the encoder 750, the polar bit allocator 735 may predetermine some available input bit positions for the selected timing related bits in the interleaved PBCH payload 741. In one example, the polar bit allocator 735 may predetermine some available input bit positions based on the channel reliability of the corresponding input bit of an encoder. The polar bit allocator 735 may select available input bits having a highest reliability in a front half portion of the encoder 750, and then allocate the selected timing related bits to the predetermined input bit positions of the encoder 750. In such as case, an UE that receives such an encoded PBCH payload can perform a sequence matching algorithm on the four selected timing related bits in the predetermined positions. Because the UE knows the predetermined positions for the selected timing related bits, the UE may not need to decode the full encoded PBCH payload. That is to say, the predetermined positions of the selected timing related bits are known for the UE, thus the UE can compare the selected timing related bits to several matching permutations to demine a match, Once the selected timing related bits are matched to a permutation, the selected timing related bits can be detected without performing full PBCH decoding. In addition, a decoder may not be necessary in this sequence matching procedure.

While the polar bit allocator 735 is shown as part of the interleaver block 740, it should be understood that the polar bit allocator 735 can be included either entirely or partially in any of the blocks 710, 720, 730, 740, and 750. In other words, the functions of the polar bit allocator 735 can be performed in a separate block or performed as part of any of the blocks 710, 720, 730, 740, and 750 or distribute across any number of the blocks.

Figure 8A:
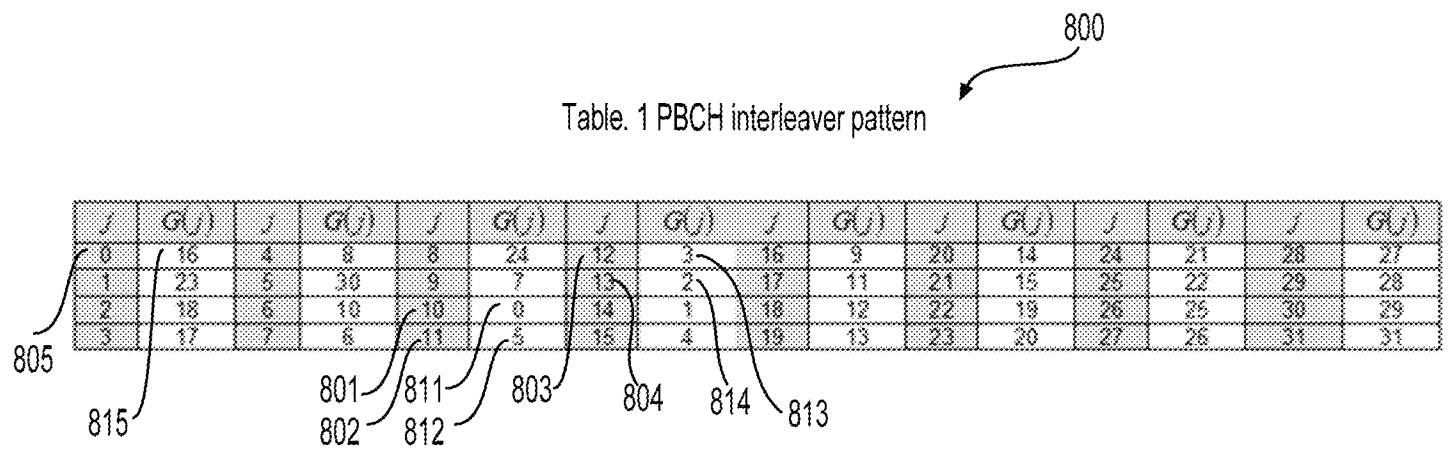

FIG. 8A shows an exemplary PBCH interleaver pattern 800. Such a PBCH interleaver pattern can be used by the interleaver block 740 in order to allocate the selected timing related bits to input bit positions of the encoder 750. For example, the selected timing related bits C0, b5, b4, and b3 are located at locations $a_{10}, a_{11}, a_{12},$ and $a_{13}$, respectively, in the sequence of PBCH payload 711 which is generated by the PBCH payload generation block 710. The locations of the selected timing related bits C0, b5, b4, and b3 can remain unchanged after the PBCH payload 711 passes through the scrambling block 720 and the CRC encoder block 730. Thus C0, b5, b4, and b3 are still positioned at $a_{10}, a_{11}, a_{12},$ and $a_{13}$, respectively, when they are input to the interleaver block 740. According to the interleaver pattern in FIG. 8A, the interleaver 740's input bits $a_{10}$ 801, $a_{11}$ 802, $a_{12}$ 803, and $a_{13}$ 804 (i.e., C0, b5, b4, and b3) are interleaved to $G_0$ 811, $G_5$ 812, $G_3$ 813, and $G_2$ 814, respectively. Each of the interleaved bits will be mapped by the polar bit allocator 735 to a corresponding input bit position of the encoder 750. In addition, the interleaver block 740 also interleaves other information bits in PBCH. For example, an information bit $a_0$ 805 is interleaved to $G_{16}$ 815.

FIG. 8B shows an exemplary mapping function 820 of the polar bit allocator 735 according to an embodiment of the disclosure. As described above, the mapping function of the polar bit allocator 735 is to allocate the selected timing related bits to input bit positions of the encoder 750. In the FIG. 8B example, it is also assumed that there are 512 input bit positions in the encoder 750 and some of them are frozen bits, and thus not available for allocating bits. For example, input bit position 245 is a frozen bit and not available for allocating an information bit.

According to FIG. 8B, the four interleaved timing related bits $G_0$ 821, $G_2$ 822, $G_3$ 823, and $G_5$ 824 are mapped by the polar bit allocator 735 to the encoder 750's input bit positions 247 (831), 253 (832), 254 (833), and 255 (834), respectively. As shown, each of other information bits is also mapped to a corresponding input bit position of the encoder 750. For example, $G_{16}$ 825 is mapped to the input bit position 473 (835). In addition, it is noted that each of the four selected timing related bits is allocated in a front portion of the sequence of input bit positions of the encoder 750, so that the four selected timing related bits can be decoded earlier than other information bits. As a result, the decoding procedure can be terminated earlier once the four selected timing related bits are decoded. The decoding procedure of early termination is shorter than that of full PBCH decoding, thus the decoding complexity and power consumption can be reduced.

Figure 9:
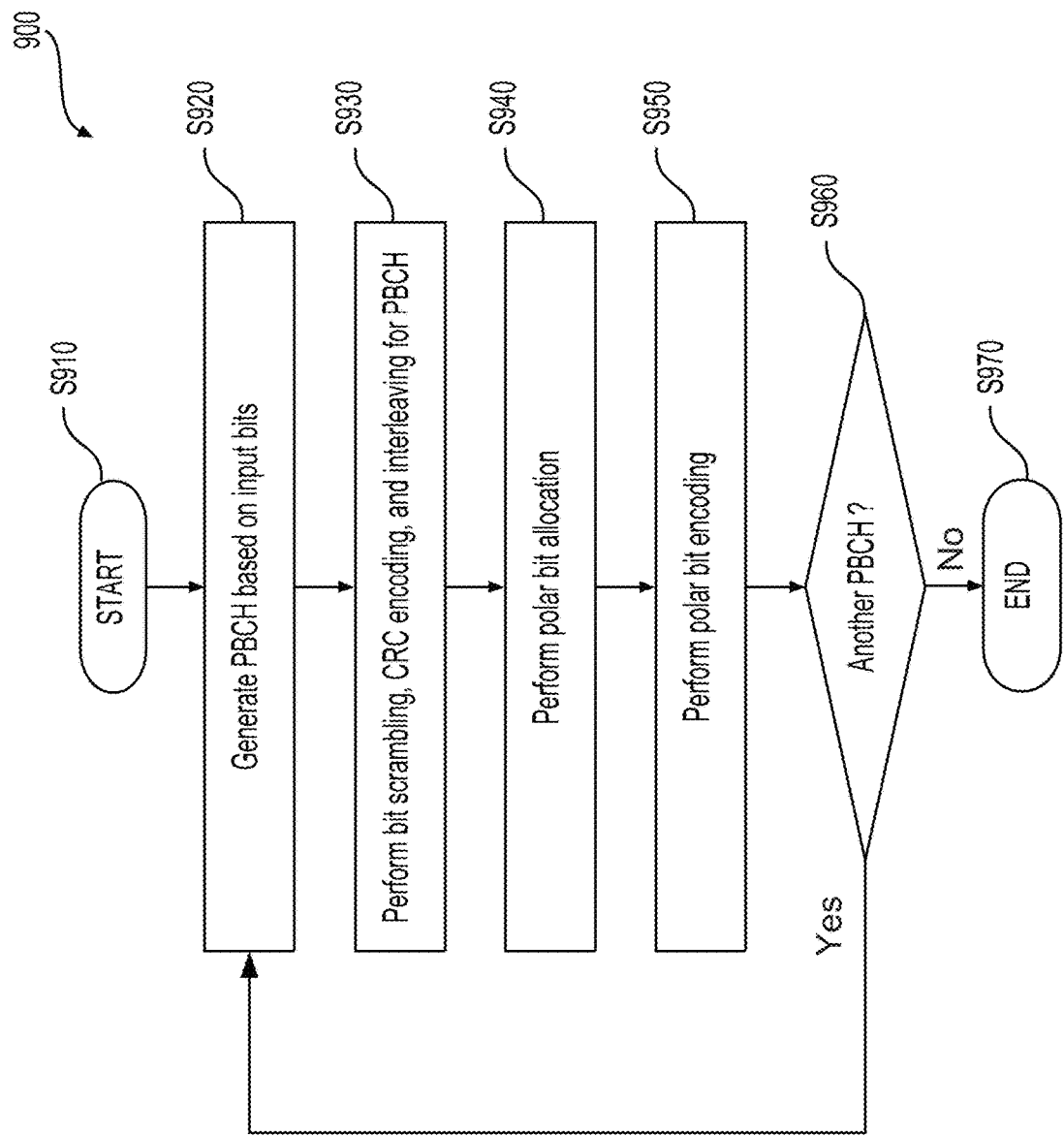
FIG. 9 shows a flowchart of an exemplary polar bit allocation process according to an embodiment of the disclosure.

FIG. 9 shows a flowchart of an exemplary polar bit allocation process 900 according to an embodiment of the disclosure. The process can be performed by the apparatus 700 and aspects of the process 900 are explained with reference to FIG. 7. The process 900 starts at S910 and proceeds to S920.

At step S920, a PBCH payload is generated based on input bits. The PBCH payload can include system information bits and timing related information bits. With reference to FIG. 7, the PBCH payload can be generated, for example, by PBCH payload generation block 710. The input bits may be from an upper layer, such as a transport layer. Based on these input bits, the PBCH payload generation block 710 generates a PBCH payload in a manner that is consistent with NR Spec in 38.212 subsection 7.1.1. After generating the PBCH payload, the process 900 proceeds to step S930.

At step S930, the generated PBCH payload is scrambled, encoded, and interleaved. With reference to FIG. 7, the generated PBCH payload can be scrambled, for example, by the bit scrambling block 720. At a result, a scrambled PBCH payload is generated by the bit scrambling block 720. The scrambled PBCH payload can then be encoded by the CRC encoding block 730. The output data of the CRC encoding block 730 includes the scrambled PBCH payload with a CRC code that is generated based on the scrambled PBCH payload. Subsequently, the interleaver 740 receives the output data of the CRC block 730 and can transform it into an interleaved PBCH payload that includes a distributed CRC code and PBCH payload. After generating the interleaved PBCH payload, the process 900 proceeds to step S940.

At step S940, each bit of the interleaved PBCH payload can be allocated to a corresponding input bit position of an encoder according to a mapping function. With reference to FIG. 7, each bit of the interleaved PBCH payload can be mapped, for example, by the polar bit allocator 735 to a corresponding input bit position of the encoder 750. At least three mapping functions can be used by the polar bit allocator 735 to map the interleaved PBCH payload.

A first mapping function can include: (1) identifying and skipping frozen bits and unavailable positions in a sequence of input bits of an encoder; (2) selecting a portion of timing related bits from a PBCH payload; (3) selecting some available input bit positions with smallest available indexes in the sequence of input bits of the encoder for the selected timing related bits; and (3) allocating the selected timing related bits to the selected positions in the sequence of input bits of the encoder.

A second mapping function can include: (1) identifying and skipping frozen bits and unavailable positions in a sequence of input bits of an encoder; (2) selecting a portion of timing related bits from a PBCH payload; (3) selecting some available input bit positions with a highest reliability in the sequence of input bits of the encoder for the PBCH payload; and (4) allocating the selected timing related bits to the front portion of the selected input bit positions of the encoder.

A third mapping function can include: (1) identifying and skipping frozen bits and unavailable positions in a sequence of input bits of an encoder; (2) selecting a portion of timing related bits from a PBCH payload; (3) selecting some available input bit positions having a highest reliability in a front half portion of the sequence of input bits of the encoder for the selected timing related bits; and (3) allocating the selected timing related bits to the selected positions in the sequence of input bits of the encoder.

After allocating each bit of the interleaved PBCH payload to a corresponding input bit position of the encoder, the process 900 proceeds to step S950.

At step S950, a sequence of input bits is encoded. The sequence of input bits includes an interleaved PBCH payload with frozen bits or without frozen bits. Each bit of the interleaved PBCH payload is allocated by a polar bit allocator to a corresponding input bit position of the polar encoder before the polar encoder encodes the sequence of input bits. After finishing encoding procedure, the process 900 proceeds to step S960.

At step S960, it is determined that whether another PBCH payload is necessary. If it is determined that another PBCH payload is needed, the process 900 will return to step S920 to generate another PBCH payload based on input bits. Otherwise, the process 900 will proceed to step S970 and terminate at S970.

It is noted that while the process 900 is described as a sequence of steps, in various examples, the steps can be performed in a different order or in parallel. In addition, not all steps need to be performed in some examples.

Figure 10:
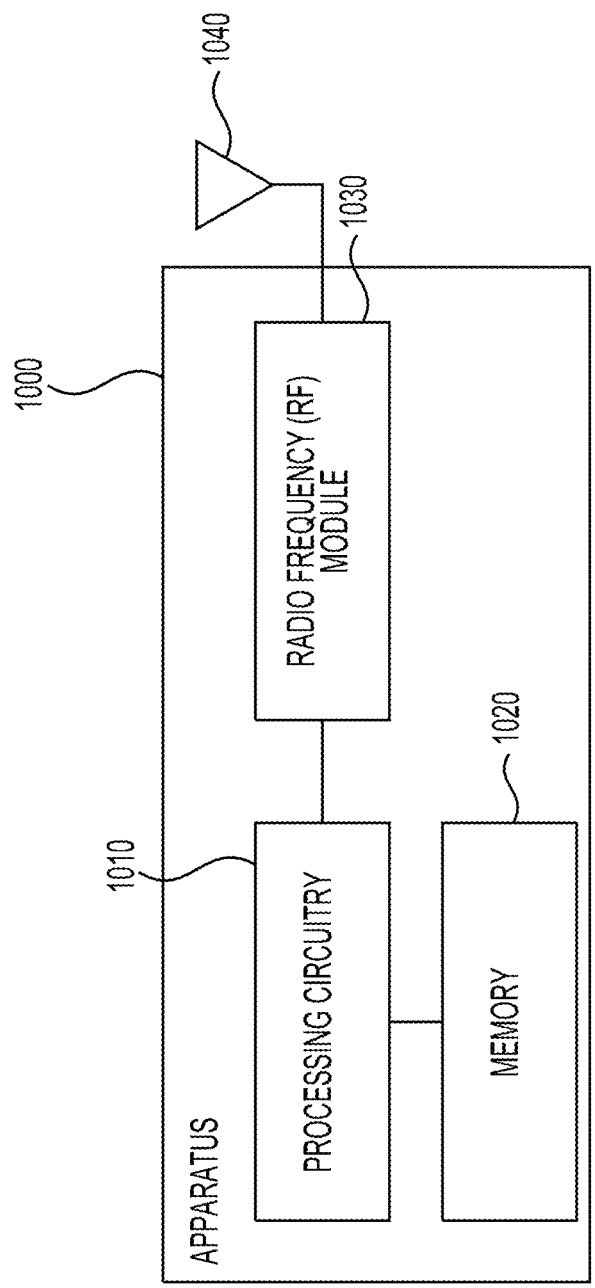
FIG. 10 shows an exemplary apparatus according to embodiments of the disclosure.

FIG. 10 shows an exemplary apparatus 1000 according to embodiments of the disclosure. The apparatus 1000 can be configured to perform various functions in accordance with one or more embodiments or examples described herein. Thus, the apparatus 1000 can provide means for implementation of techniques, processes, functions, components, systems described herein. For example, the apparatus 1000 can be used to implement functions of the UE, 110, the BS 120 in various embodiments and examples described herein. The apparatus 1000 can be a general purpose computer in some embodiments, and can be a device including specially designed circuits to implement various functions, components, or processes described herein in other embodiments. The apparatus 1000 can include processing circuitry 1010, a memory 1020, and a radio frequency (RF) module 1030.

In various examples, the processing circuitry 1010 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1010 can be a central processing unit (CPU) configured to execute program instructions to perform various functions and processes described herein. Accordingly, the memory 1020 can be configured to store program instructions. The processing circuitry 1010, when executing the program instructions, can perform the functions and processes described herein. The memory 1020 can further store other programs or data, such as operating systems, application programs, and the like. The memory 1020 can include a read only memory (ROM), a random access memory (RAM), a flash memory, a solid state memory, a hard disk drive, an optical disk drive, and the like.

The RF module 1030 receives processed data signal from the processing circuitry 1010 and transmits the signal via an antenna 1040, or vice versa. The RF module 1030 can include a digital to analog convertor (DAC), an analog to digital converter (ADC), a frequency up convertor, a frequency down converter, filters, and amplifiers for reception and transmission operations. In some examples, the RF module 1040 can include multi-antenna circuitry (e.g., analog signal phase/amplitude control units) for beamforming operations. The antenna 1040 can include one or more antenna arrays.

The apparatus 1000 can optionally include other components, such as input and output devices, additional or signal processing circuitry, and the like. Accordingly, the apparatus 1000 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of bit allocation for generating a synchronization signal block, comprising:
    generating timing related bits that indicate a timing of the synchronization signal block in a synchronization burst;
    selecting a portion of the generated timing related bits to be included in a payload of a broadcast channel in the synchronization signal block; and
    obtaining encoded bits for transmission by encoding the payload of the broadcast channel according to an encoding process that includes bit channels, the selected portion of the timing related bits being allocated to input bits of the encoding process that are associated with a portion of the bit channels of the encoding process subject to be decoded prior to other portion of the bit channels of the encoding process.

2. The method according to claim 1, wherein
    the bit channels of the encoding process are associated with respective bit channel reliabilities.

3. The method according to claim 2, wherein
    broadcasting information bits of the payload of the broadcast channel and the selected portion of the timing related bits are allocated to second input bits of the encoding process that are associated with available bit channels with highest reliabilities among the bit channels of the encoding process, and
    the selected portion of the timing related bits is allocated to a front portion of the second input bits of the encoding process.

4. The method according to claim 1, wherein
    the payload of the broadcast channel includes a physical layer part and a transport layer part, and
    the transport layer part includes system information and part of a system frame number.

5. The method according to claim 4, wherein
    the selected portion of the timing related bits includes at least a half-frame indication bit and three bits of a block index of the synchronization signal block, and
    the selected portion of the timing related bits is included in the physical layer part of the payload of the broadcast channel.

6. The method according to claim 5, wherein the three bits of the block index included in the selected portion of the timing related bits are three most significant bits of the block index.

7. The method according to claim 1, wherein the broadcast channel is a physical broadcast channel (PBCH).

8. The method according to claim 1, wherein the encoding process is a polar code encoding process.

9. A method of bit allocation for generating a synchronization signal block, comprising:
    generating timing related bits that indicate a timing of the synchronization signal block in a synchronization burst;
    selecting a portion of the generated timing related bits to be included in a payload of a broadcast channel in the synchronization signal block; and
    obtaining encoded bits for transmission by encoding the payload of the broadcast channel according to an encoding process that includes bit channels,
        broadcasting information bits of the payload of the broadcast channel and the selected portion of the timing related bits being allocated to input bits of the encoding process that are associated with available bit channels with highest reliabilities among the bit channels of the encoding process, and
        the selected portion of the timing related bits being allocated to a front portion of the input bits of the encoding process.

10. The method according to claim 9, wherein the payload of the broadcast channel includes a physical layer part and a transport layer part, and
    the transport layer part includes system information and part of system frame number.

11. The method according to claim 10, wherein
    the selected portion of the timing related bits includes at least a half-frame indication bit and three bits of a block index of the synchronization signal block, and
    the selected portion of the timing related bits is included in the physical layer part of the payload of the broadcast channel.

12. The method according to claim 11, wherein the three bits of the block index included in the selected portion of the timing related bits are three most significant bits of the block index.

13. The method according to claim 9, wherein the broadcast channel is a physical broadcast channel (PBCH).

14. The method according to claim 9, wherein the encoding process is a polar code encoding process.

15. A device for generating a synchronization signal block, comprising:
    processing, circuitry configured to:
        generate timing related bits that indicate a timing of the synchronization signal block in a synchronization burst;
        select a portion of the timing related bits to be included in a payload of a broadcast channel in the synchronization signal block; and
        obtain encoded bits for transmission by encoding the payload of the broadcast channel according to an encoding process that includes bit channels, broadcasting information bits of the payload of the broadcast channel and the selected portion of the timing related bits being allocated to input bits of the encoding process that are associated with available bit channels with highest reliabilities among the bit channels of the encoding process, and the selected portion of the timing related bits being allocated to a front portion of the input bits of the encoding process.

16. The device according to claim 15, wherein
the bit channels of the encoding process are associated with respective bit channel reliabilities.

17. The device according to claim 15, wherein the payload of the broadcast channel includes a physical layer part and a transport layer part, and
the transport layer part includes system information and part of system frame number.

18. The device according to claim 17, wherein the selected portion of the timing related bits includes at least a half-frame indication bit and three bits of a block index of the synchronization signal block, and the selected portion of the timing related bits is included in the physical layer part of the payload of the broadcast channel.

19. The device according to claim 18, wherein the three bits of the block index included in the selected portion of the timing related bits are three most significant bits of the block index.

20. The device according to claim 15, wherein the encoding process is a polar code encoding process.

* * * * *